United States Patent [19]
Vinciguerra et al.

[11] Patent Number: 5,259,419
[45] Date of Patent: Nov. 9, 1993

[54] KEYING LEVER ARRANGEMENT IN A HIGH-SPEED ROTARY DOBBY

[75] Inventors: Costantino Vinciguerra, Florence; Massimo Altamore, Scandicci; Massimiliano Boni, Florence; Massimo Coppini, Borgo San Lorenzo; Francesco Grifoni, Vicchio, all of Italy

[73] Assignee: Nuovopignone Industrie Meccaniche e Fonderia SpA, Florence, Italy

[21] Appl. No.: 920,128

[22] Filed: Jul. 24, 1992

[30] Foreign Application Priority Data

Jul. 25, 1991 [IT] Italy .................. MI91-A-002058

[51] Int. Cl.⁵ .............................................. D03C 1/00
[52] U.S. Cl. ................................. 139/66 R; 139/76; 139/455
[58] Field of Search ................. 139/66 R, 76, 455

[56] References Cited

U.S. PATENT DOCUMENTS

| | | |
|---|---|---|
| 3,180,366 | 4/1965 | Hoenig ................. 139/66 R |
| 3,207,186 | 9/1965 | Hoenig ................. 139/66 R |
| 3,724,510 | 4/1973 | Kleiner ................. 139/66 R |
| 4,441,528 | 4/1984 | Julich . |
| 4,461,325 | 7/1984 | Palan et al. . |
| 4,730,641 | 3/1988 | Schwarz .................... 139/76 |
| 4,905,738 | 3/1990 | Kleiner ..................... 139/76 |

FOREIGN PATENT DOCUMENTS

| | | |
|---|---|---|
| 0079843 | 5/1983 | European Pat. Off. . |
| 0082906 | 7/1983 | European Pat. Off. . |
| 0185780A1 | 7/1986 | European Pat. Off. . |
| 0444726A1 | 9/1991 | European Pat. Off. . |
| 0467444A1 | 1/1992 | European Pat. Off. . |
| 2909131 | 9/1980 | Fed. Rep. of Germany . |

Primary Examiner—Andrew M. Falik
Attorney, Agent, or Firm—Morgan & Finnegan

[57] ABSTRACT

A high-speed rotary dobby key mover mechanism having a main crank arm in which two keying levers that have the same arm ratio are mounted for pivotal movement on a cam in opposing positions. The adjacent ends of the keying levers cooperate with a key, while the free other ends of the key levers, which are diametrically opposite about and at the same distance from the axis of the dobby drive shaft for the dobby cooperate alternately with a single control device which is located on only one side of the main crank arm. The control device is regulated, moreover, by a logic unit.

8 Claims, 7 Drawing Sheets

KEYING LEVER ARRANGEMENT IN A HIGH-SPEED ROTARY DOBBY

BACKGROUND OF THE INVENTION

1. Field of the Invention

This invention relates to improvements in a high-speed dobby. By reducing the number of mover members required for moving the keys which control the rocking movement of the main dobby crank arms and for locking said main crank arms in position, and hence reducing the inertial mass in play, and in addition by operating said mover members by a single control device operating on only one side of the main crank arms and situated in the most accessible region of the dobby, and moving them only during the pauses in the rotation of the drive shaft imposed by the modulator, result not only in a considerable cost reduction and ease of maintenance, but also in higher speeds as required by modern air and water looms together with considerable reliability and extreme safety even in the case of random malfunction of the controls. In addition there is an increase in the time available for the execution of said controls and it becomes possible to achieve reverse running from any angular position of the drive shaft without the need to use additional members.

More specifically, the invention relates to new key mover mechanisms which are extremely simple and functional, each consisting substantially of two single opposing keying levers pivoted on the cam of the crank arm, they cooperating at one end with the relative key and at their other end with a single control device. The invention also relates to a particular control device comprising two identical cam systems operating alternately at each half-revolution of the dobby drive shaft on a single operating unit composed of two pushers of different travel strokes for respectively locking the cam and extracting the key by acting on one of said two opposing keying levers of the key mover mechanisms.

2. Description of the Related Art

In rotary dobbies each main crank arm is mounted idly on the drive shaft via a cam which is interposed between the shaft and the big end of the crank arm, to be rigidly connected by a key to said crank arm or to said shaft, which moves with intermittent motion in the form of 180° rotations followed by a pause, the key being movably supported by said cam and being urged during said drive shaft pauses by mechanical movement means such that one of its ends engages one of two opposing radial grooves provided in the big end of the main crank arm or one of two opposing radial grooves provided in the drive shaft. Various types of key mover mechanisms for a rotary dobby are known from the state of the art.

In the construction described in European Patent appln. publication No. 0 466 234 of Jan. 15, 1992 by the present applicant, said mechanism consists substantially of an elliptical control ring mounted coaxial to the dobby drive shaft and inserted into a suitable transverse groove provided in the key body, said ring being fixed on an operating lever which has always to be repositioned in its central rest position by a complex elastic system and has its fulcrum in a region which is not easily accessible.

Although such a construction has the advantage of being able to be operated by a single control device located on only one side of the main crank arm, it has however various drawbacks the main one of which derives from the considerable moving masses which generate intense inertial forces and hence necessitate corresponding greater control forces with the consequent need for more costly and complicated structures. A further drawback is the difficulty of mounting the unit comprising the main crank arms, the ring control levers and the elastic reaction systems. Said drawbacks are attenuated in other key mover mechanisms known in the art in which a single lever rigid with the key and hinged to the cam is used (see for example U.S. Pat. No. 4,544,000 or European patent application 239,514, both by Staubli). These latter have however the drawback of requiring a control device which has to act in two opposing positions about the dobby drive shaft, which in addition to constructional and assembly complications makes it necessary to effect the movements outside the pauses in the rotation of the drive shaft, with consequent reduced reliability.

SUMMARY OF THE INVENTION

The object of the present invention is to obviate the aforesaid drawbacks by providing extremely simple and functional key mover mechanisms of very low mass and high reliability which can be operated by control devices acting on only one side of the main crank arms only during the pauses in the drive shaft.

This object is substantially attained by using two keying levers both pivoted on the cam of each main crank arm of the dobby such that they lie opposite each other about the key with which they cooperate via one of their ends, their free other ends being diametrically opposite about and at the same distance from the axis of the dobby drive shaft, said levers having an identical arm ratio and having their said free ends alternately in cooperation with a single control device.

The high-speed rotary dobby comprising a series of main crank arms the small end of each of which is hinged to a corresponding main lever and the big end of which is mounted idly on the drive shaft, which is driven with intermittent motion with pauses at every 180° of rotation by the main dobby shaft via a cam which is either rigidly connected or not rigidly connected to said drive shaft by a key, which is movably supported by the cam and during said drive shaft pauses is either inserted or not inserted into one of two opposing radial grooves in said drive shaft by a key mover mechanism operated by a single control device located on only one side of the main crank arm and controlled by a logic unit, is characterized according to the present invention in that said key mover mechanism consists of two keying levers both pivoted on said cam such that they lie opposite each other about the key with which they cooperate via one of their ends, their free other ends being diametrically opposite about and at the same distance from the axis of the dobby drive shaft, said levers having an identical arm ratio and having their said free ends alternately in cooperation with said single control device. According to a preferred embodiment of the present invention, said two keying levers are identical in shape, their free ends cooperating with said single control device via a pin projecting perpendicularly from said end and being inserted into a C-shaped guide provided on said control device and moved radially to the drive shaft in one direction or the other depending on whether the key is to be inserted into or withdrawn from said radial grooves in said drive shaft.

According to an alternative embodiment of the present invention, said key is made rigid with one of the ends of one of said two keying levers pivoted in opposing positions on the cam, the other lever having its corresponding end cooperating with said end comprising the key.

This achieves the simplification of eliminating the slidable guide for the key on the cam.

Finally, a preferred embodiment of the present invention uses a key in the form of a single hook which is rigid with one of the ends of one of said two keying levers pivoted in opposing positions on the cam and cooperates with only the grooves in the drive shaft. This embodiment eliminates the danger of possible breakage determined by incomplete extraction or insertion travel of the key which, by remaining simultaneously engaged with the grooves in the shaft and the grooves in the crank arm big end, would result in destruction of the shaft-key-crank arm system when drive shaft rotation recommences after the pause. However as the main crank arm is no longer locked in position after each extraction of the key from the shaft grooves as the key inserted into the big end of the crank arm no longer exists, this embodiment requires the use of special parts to achieve said locking.

This is substantially achieved in that the said two keying levers pivoted in opposite positions on said cam, and mutually cooperating at one of their ends where one of them comprises a key in the form of a single hook, are spring-loaded in the direction in which the key is inserted into the radial grooves in the drive shaft and are operated by an operating unit controlled by a cam system and consisting of two pushers of different lengths of travel which are spring-loaded and cooperate respectively with one of said free ends of said levers and with one of two locking slots provided in the cam in diametrically opposite positions about and at the same distance from the axis of the dobby drive shaft. In this manner the two pushers both lock the cam and hence the main crank arm in position by one of them being inserted into one of said slots, and extract the key by the other pusher acting on the free end of one of said two levers.

Hence this rotary dobby is characterized in that the said two keying levers mutually cooperate at their adjacent ends where one of them comprises a key in the form of a single hook, said levers being spring-loaded in the direction in which said key is inserted into the radial grooves in the drive shaft and being alternately operated at their free ends by one of a series of operating units controlled by a cam system of said control device for the rotary dobby, said operating unit consisting of two pushers of different travel strokes which are spring-loaded and of which the control pusher cooperates with one of said free ends of the keying levers and the auxiliary pusher cooperates with one of two locking recesses provided in the cam in diametrically opposite positions about and at the same distance from the axis of the dobby drive shaft.

Again, as it is only necessary to lock the main crank arm simultaneously with the extraction of the key from the groove in the drive shaft. A slightly early locking of said crank arm or rather of its cam with respect to said extraction would not only eliminate the deleterious vibrations consequent on the sudden halting of the drive shaft in effecting said pause but would also enable the key to be perfectly centered within the radial groove in the shaft. This will make the subsequent extraction of the key extremely simple. According to a preferred embodiment of the present invention said single operating unit controlled by a cam system of said control device for the rotary dobby is constructed with two rotatable pushers hinged on the same axis parallel to the dobby drive shaft. The control pusher which cooperates with one of the free ends of said keying levers via a tooth projecting from one of its ends is urged by a spring against a fixed abutment into a position of disengagement. The control pusher is made to rotate in opposition to said spring by said cam system of the control device. The auxiliary second pusher which cooperates with one of said locking recesses in the cam via a corresponding tooth projecting from its end, this latter tooth projecting further than the first, is urged by a spring extending between said two pushers. The spring urges in such a manner as to rotate said auxiliary second pusher towards said recesses until it reaches an abutment rigid with said first or control pusher.

In this manner, when the cam system of the control device operates said first rotatable pusher of the operating unit in order to withdraw the key, said control pusher also rotates the auxiliary second pusher the further projecting tooth of which is hence inserted into the locking recesses in the cam, to fix it in position before the key extraction stage begins, this stage then being able to take place in that the first or control pusher can continue to rotate but with a different travel distance than the now fixed auxiliary second pusher, so loading said spring extending between the two pushers.

The invention is further clarified hereinafter with reference to the accompanying drawings, which show preferred embodiments thereof by way of non-limiting example in that technical and constructional modifications can be made thereto but without leaving the scope of the present invention.

DESCRIPTION OF THE PREFERRED EMBODIMENTS

Figure 1:
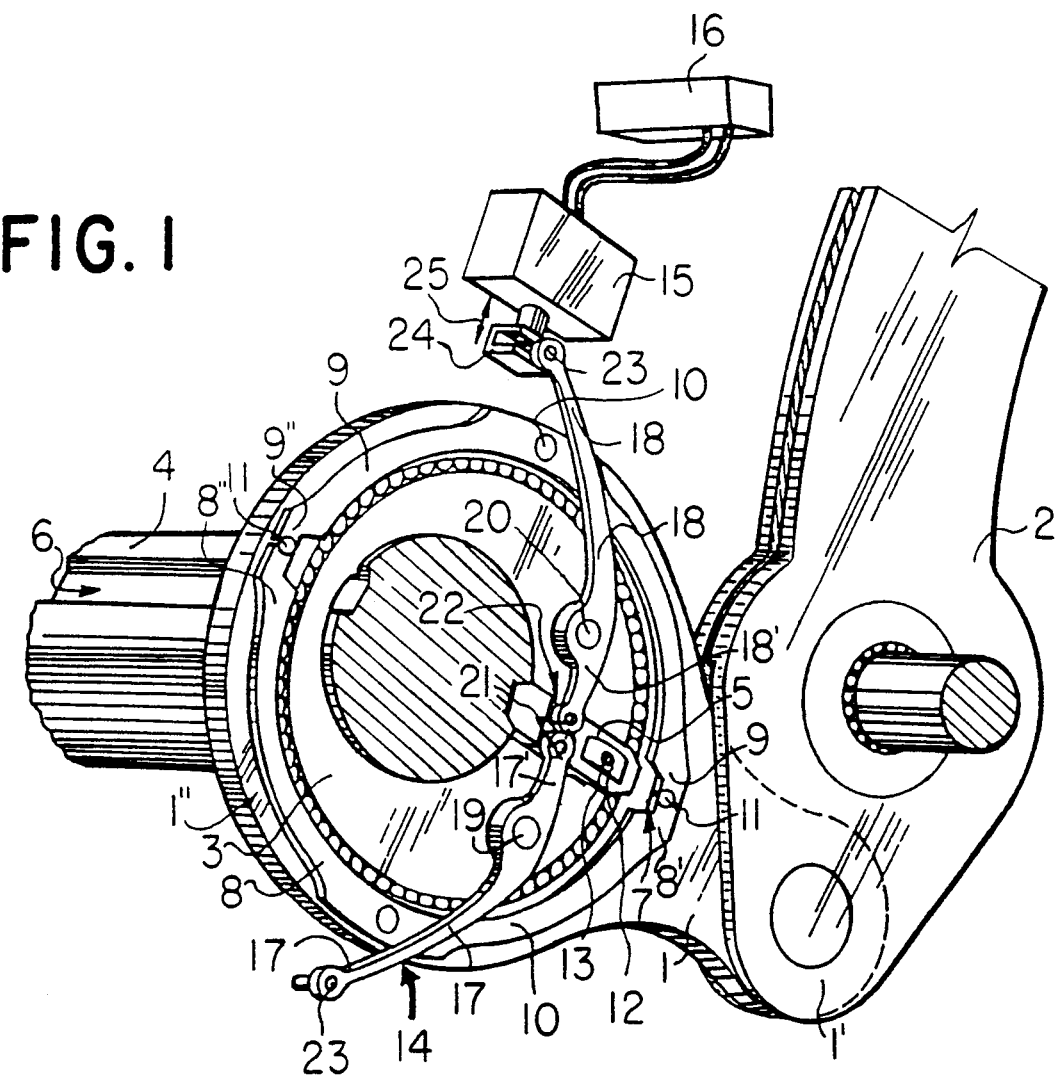
FIG. 1 is a partial perspective view of that part of a rotary dobby using the key mover mechanism constructed in accordance with the invention.

In the figures, the reference numeral 1 indicates a main crank arm of the rotary dobby, the small end 1' of which is hinged to the respective main lever 2, whereas its big end 1'' is mounted idly, via a cam 3, on a drive shaft 4 rotated with pauses at every 180° of rotation of the main drive shaft by a modulation mechanism of known type and therefore not shown in the figure. Said cam 3 is alternately connected rigidly to said crank arm 1 or to said drive shaft 4 by a key 5 which is movably supported by said cam, and of which one of its ends is inserted or not inserted, during said pauses of the drive shaft, into one of two opposing radial grooves 6 or 6' provided in said drive shaft 4 or into one of two opposing radial grooves 7 or 7' (see specifically FIGS. 1, 2 and 3) provided in said big end 1" of the main crank arm 1, these latter radial grooves being provided in correspondence with the two adjacent opposing ends, 8', 9' and 8", 9" respectively, of two specular elastic half-rings 8 and 9 which are fixed on their center line onto said head 1" of the main crank arm 1 by fixing pins 10 and are preloaded against two centering pins 11 overlying the two said radial grooves 7 and 7', said key 5 being maintained pressed against said cam 3 by a leaf spring 12 which is supported by a pin 13 rigid with said cam and passing through a slot provided in the key.

Said insertion or non-insertion of the key 5 is achieved by a key mover mechanism 14 operated by a single control device 15 located on one side of the main crank arm and controlled by a logic unit 16.

Figure 2:
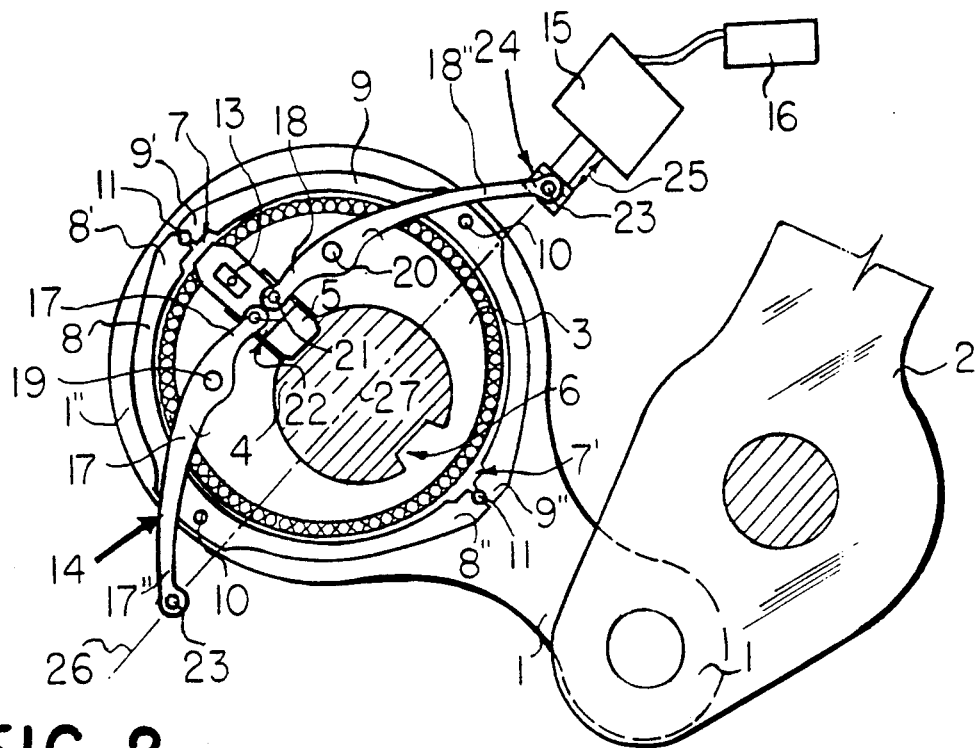
FIG. 2 is a front view of FIG. 1.
Figure 3:
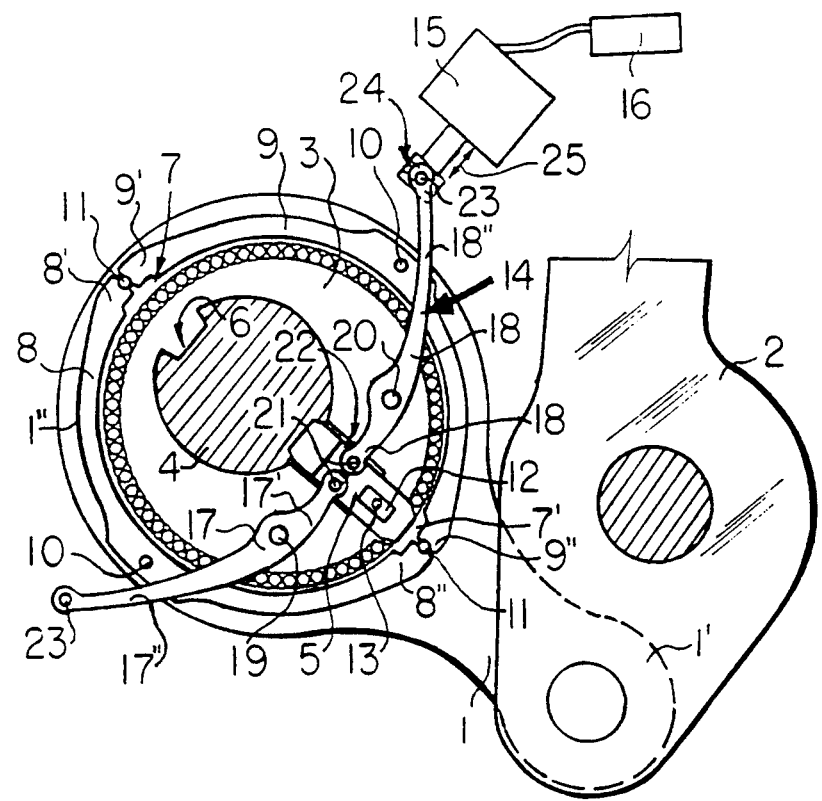
FIG. 3 is a front view of FIG. 1 after the cam has rotated through 180°.

Said key mover mechanism 14 consists according to the invention (see FIGS. 1 to 3) of two keying levers 17 and 18 of substantially identical shape, both of which are pivoted at 19 and 20 respectively on said cam 3 such as to lie opposing each other about the key 5 as clearly shown in FIG. 2, and which both cooperate, via a pin 21 projecting from their adjacent ends 17' and 18' respectively, with a transverse groove 22 in the key 5, while their free other ends 17" and 18" cooperate alternately with said single control device 15 via a pin 23 projecting perpendicularly from said free ends, which is inserted into a C-shaped guide 24 on said control device, this guide being moved in the direction of the arrow 25 radially to the drive shaft 4 and hence along the axis 26 (see FIG. 2) passing through the center of said drive shaft 4, in one direction or the other depending on whether the key 5 is to be inserted into or extracted from said radial grooves 6, 6' in the drive shaft 4. Said keying levers 17 and 18 have an identical ratio between their arms, i.e. the ratio of the distances between the pins 23-19, 19-21 and 23-20, 20-21 is constant, and in addition the pins 23 at said free ends 17" and 18" diametrically oppose each other and are at the same distance from the axis 27 of the drive shaft 4 (see FIG. 2) and hence lie on said axis 26. This ensures that for each 180° rotation of the cam 3 there is always a pin 23 cooperating with the control-shaped guide 24 on the control device 15, as shown in FIGS. 2 and 3, and that an equal movement of the key 5 is always obtained independently of which keying lever is acting.

Figure 4:
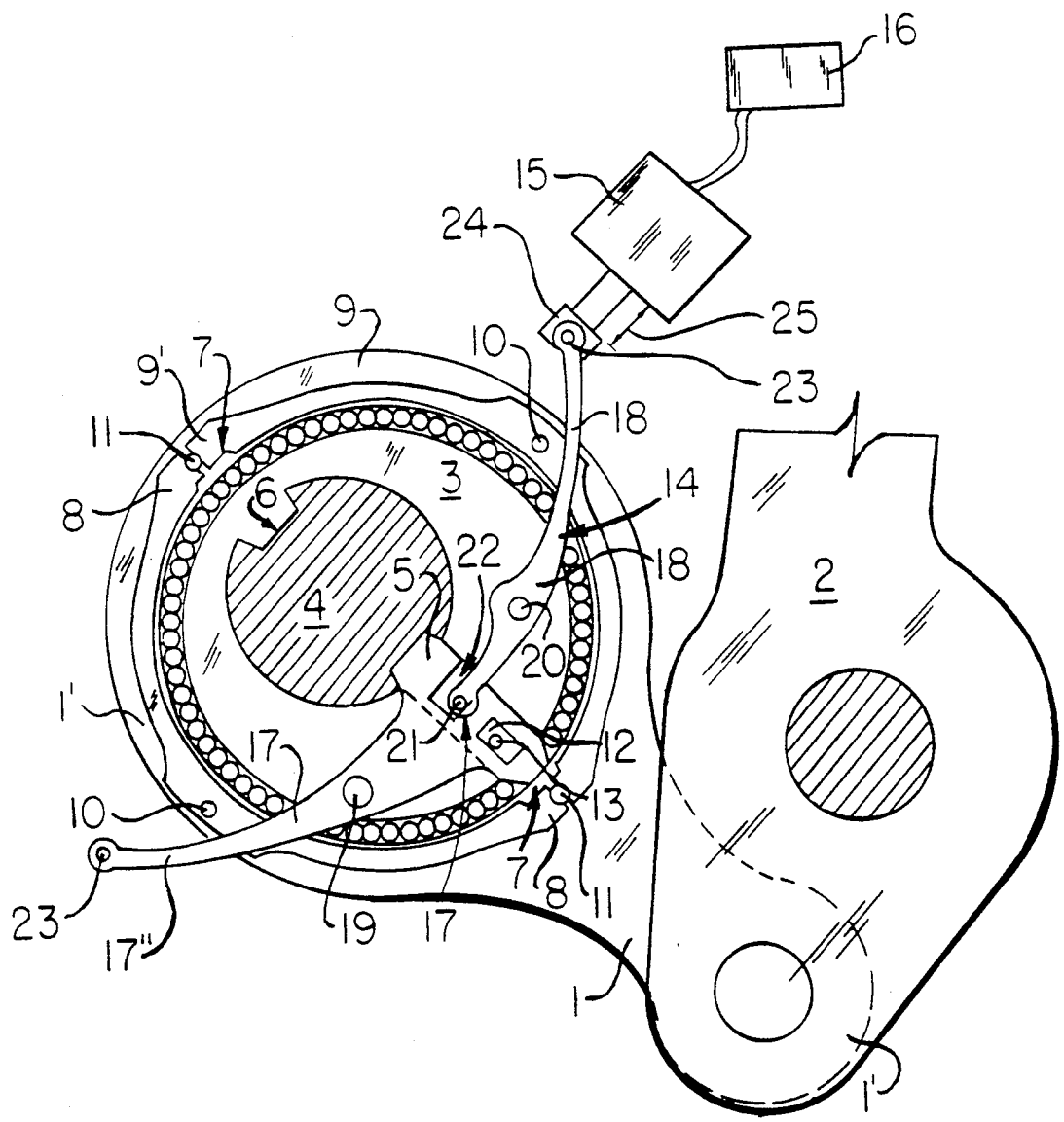
FIG. 4 is a front view of a modification of the invention.

The modification shown in FIG. 4 differs only in that the key 5 is no longer an independent member but is incorporated into the non-free end 17' of the keying lever 17.

Figure 5:
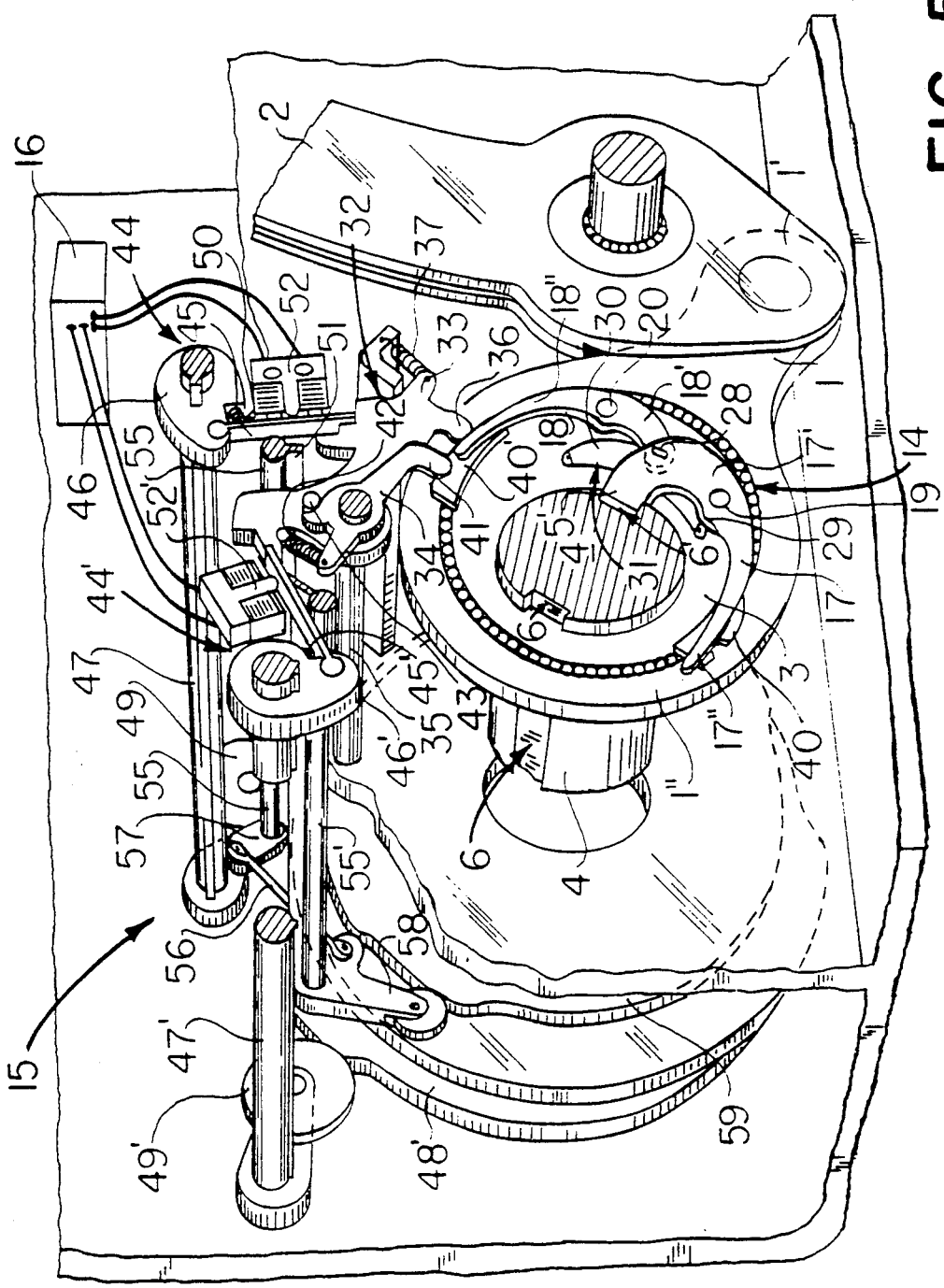
FIG. 5 is a perspective view of a preferred embodiment of the invention.
Figure 6:
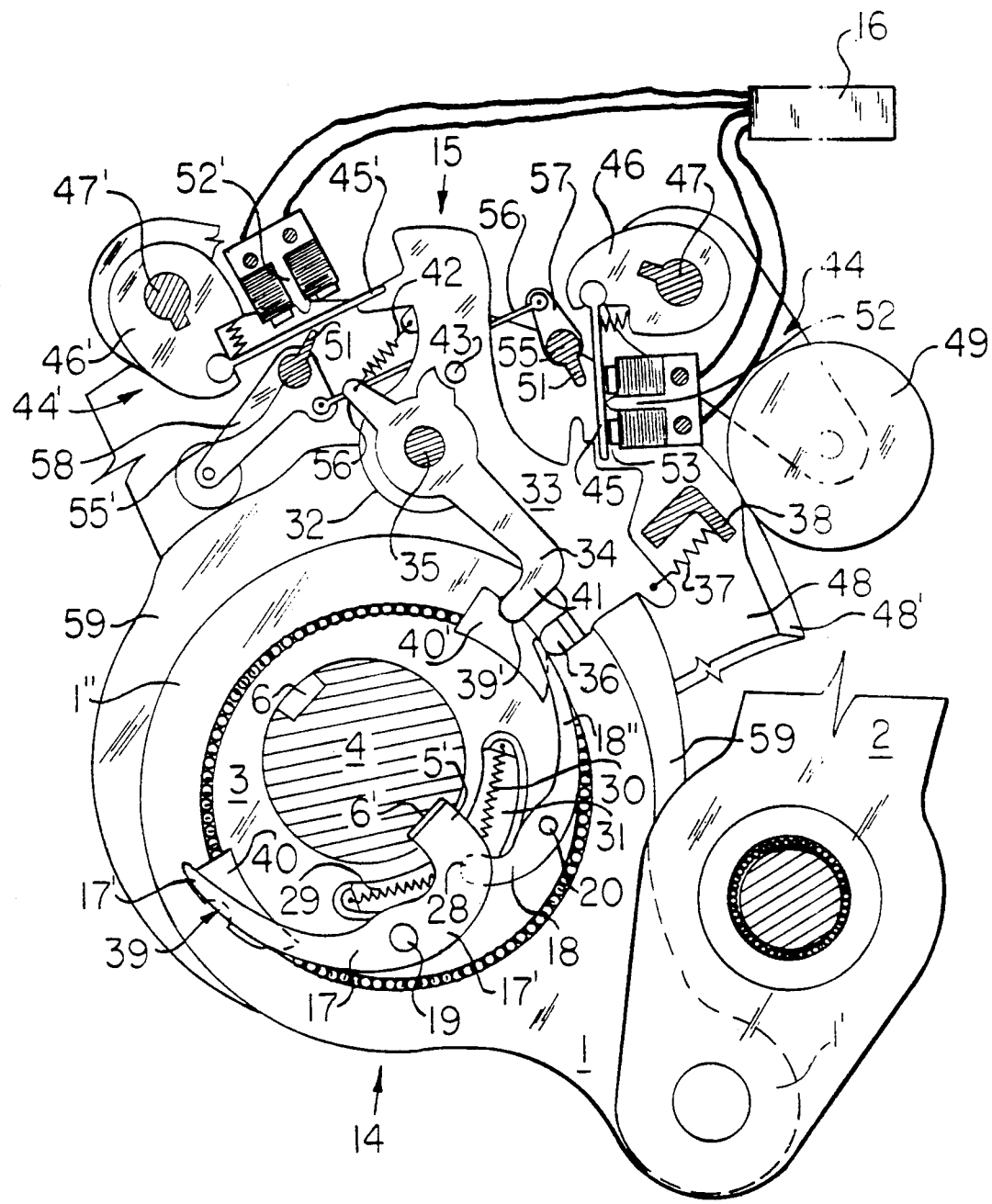
FIG. 6 is a partial front view of FIG. 5 to an enlarged scale.
Figure 7:
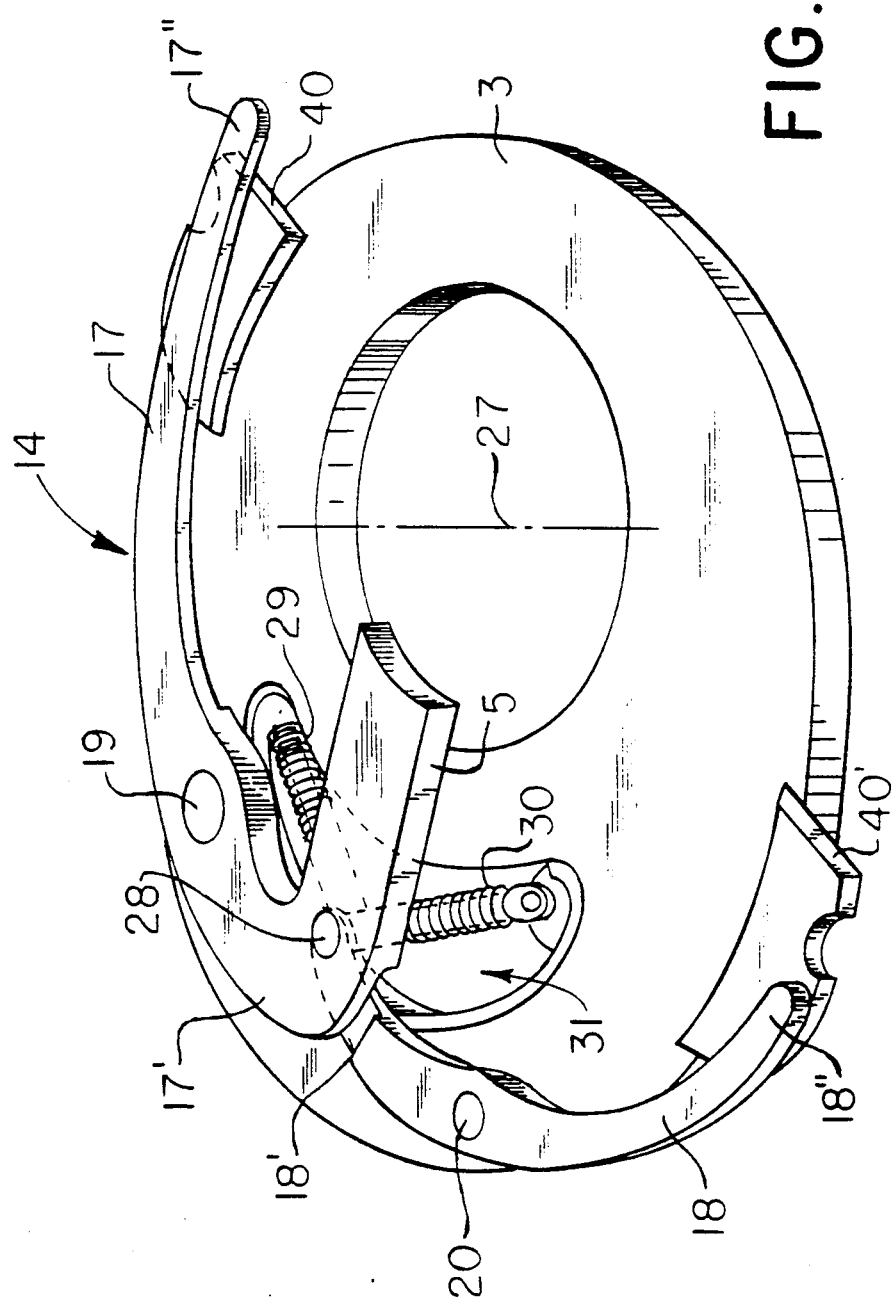
FIG. 7 is a perspective view of a detail of FIG. 5 to an enlarged scale.

In the embodiment shown in FIGS. 5, 6 and 7 the key is reduced to a single hook 5' projecting from the end 17' of the keying lever 17, the end 17' being hinged to the adjacent end 18' of the other keying lever 18 by a pin 28. The two levers 17 and 18 are spring-loaded in the sense of urging the key 5' into insertion in the radial grooves 6 or 6' of the drive shaft 4, by two springs 29 and 30 housed in a slot 31 provided in the cam 3 and extending in inverted V form between said pin 28 and the inner wall of said slot 31.

In this case the cam 3 and hence the main crank arm 1 are locked in position by the relative operating unit 32 consisting of two rotatable pushers 33 and 34 hinged on the same pivot 35 parallel to the dobby drive shaft 4. Of said pushers, the control pusher 33 is arranged to cooperate with one of the free ends 17" and 18" of said key-ing levers 17 and 18 via a tooth 36 projecting from one of its ends and is urged by a spring 37 against a fixed abutment 38 into a position in which said free ends are disengaged; the other or auxiliary pusher 34 is arranged to cooperate with one of two locking recesses 39, 39' provided in appendices 40 and 40' of the cam 3 in diametrically opposing positions at the same distance from the axis 27 of the drive shaft 4 (see specifically FIG. 7), by means of a corresponding tooth 41 projecting from its end further than the first tooth 36, and is urged by a spring 42 extending between the two pushers 33 and 34 and tending to rotate it towards said recesses 39, 39' as far as an abutment 43 rigid with the control pusher 33.

Said different-stroke pushers 33 and 34 of each operating unit 32 are operated, in the sense of being moved against the end 17' or 18' respectively of the keying levers 17 and 18 and into the recesses 39 or 39' of the cam 3, by two separate identical control units 44 and 44' of cam type, each of which comprises a striker bar 45 (45') of ferrous material, hinged by one of its ends to an arm 46 (46') projecting from a single shaft 47 (47') on which all the other corresponding arms of the control device 15 are mounted, said single shaft being rocked by a cam 48 (48') fixed onto the main dobby shaft (not shown in the figure), by a feeler roller 49 (49') projectingly supported by said shaft. Said striker bar 45 (45') is urged by a spring 50 (50') against an accompanying arm 51 (51') which rotates it from a first position in which it cooperates with the relative control pusher 33 (see specifically the position of the bar 45' in FIG. 6) to a second position in which it is in contact with an amagnetic shoulder 52 (52') which creates a very small air gap 53 between it and the relative electromagnet 54 (54'), which is energized in accordance with a predetermined program of said logic unit 16 (see specifically the position of the bar 45 in FIG. 6). Said accompanying arm 51 (51') is rigid with a single shaft 55 (55') on which all the other corresponding accompanying arms of the control device 15 are mounted, the two said shafts 55 and 55' being connected together by a connecting rod 56 pivoted between two appendices 57 and 58 respectively of said shafts to enable these to be rocked in mutual opposition by a further single cam 59 via a feeler roller 60 supported by said appendix 58.

Figure 8:
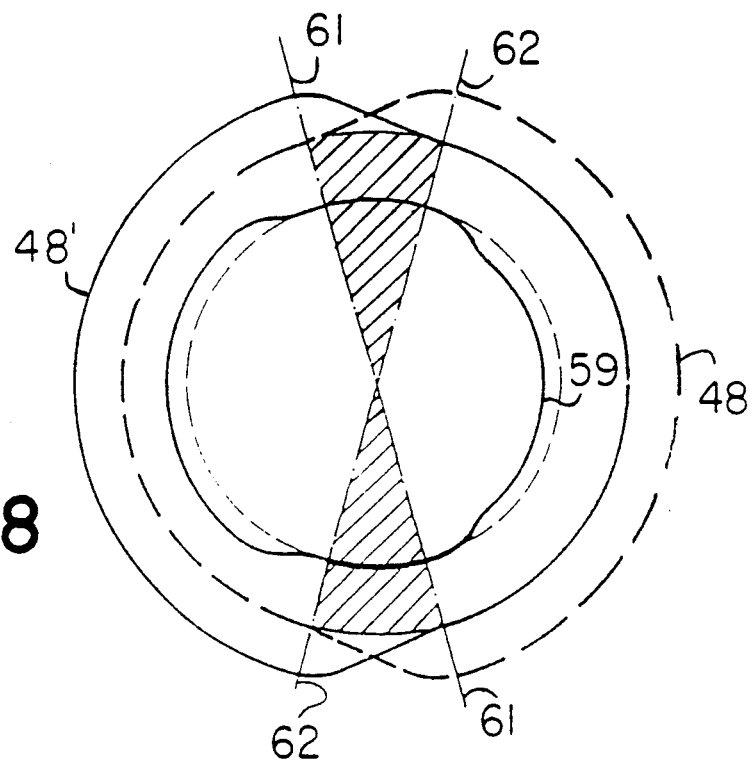
FIGS. 8 and 9 are diagrams illustrating the operation of the cam system of the rotary dobby control device.
Figure 9:
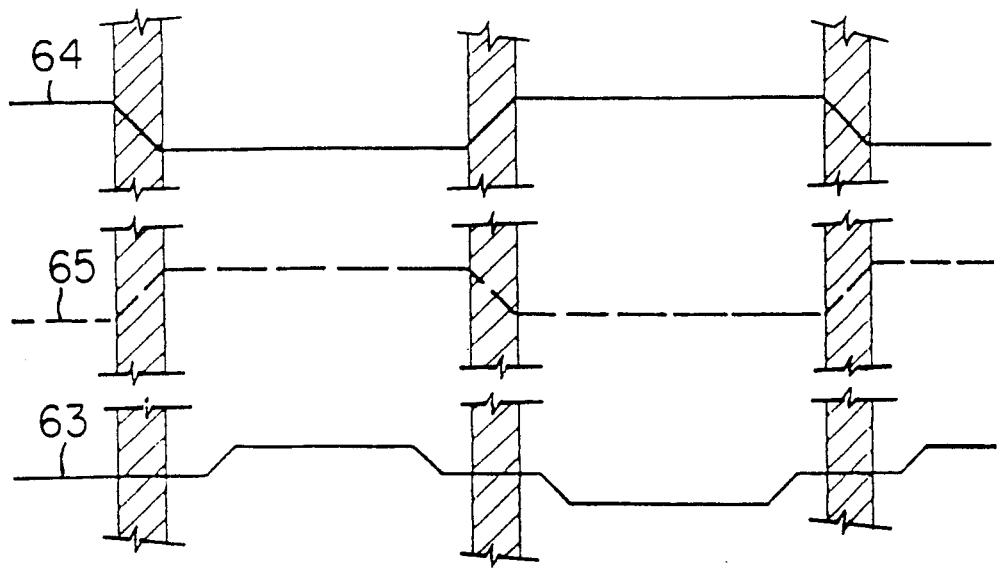

This latter cam 59' is synchronized with said cams 48 and 48' and has a contour (see specifically FIG. 8 in which the pauses of the dobby drive shaft 4 are represented by the opposing hatched sectors enclosed between the axes 61 and 62) which causes it to act outside said pauses as clearly shown in FIG. 9 by the diagram 63, in which the horizontal axis represents the degrees through which the main dobby shaft has turned, the pauses of the drive shaft 4 being represented by the hatched regions which lie 180° apart, and the vertical axis represents the extent of movement of said accompanying arms 51 or 51'. The two identical cams 48 and 48' have equal contours which are angularly staggered mutually (see FIG. 8 in this respect) so that they act alternately and only during said pauses at each half revolution of the main shaft, as can be clearly seen in FIG. 9 by the diagrams 64 and 65, in which the horizontal axis represents the degrees through which the main dobby shaft has turned, the pauses of the drive shaft 4 being represented by the hatched regions which lie 180° apart, and the vertical axis represents the movements of the striker bars 45 and 45' respectively.

In this manner, as the keying and crank arm locking members, which represent those which could accidentally cause serious damage, are moved only during the pauses and then remain at rest in their attained positions (see FIG. 9, diagrams 64 and 65), there is evidently no material possibility of causing damage of any kind.

We claim:

1. A high-speed rotary dobby that has a series of main crank arms, said arms each having a small end, a big end, a drive shaft having at least two opposing radial grooves formed therein, a main lever hinged to the corresponding small end and the big end of which is mounted idly on the drive shaft, a cam for driving with intermittent motion with pauses at every 180° of rotation by the drive shaft, a key for selectively connecting said cam rigidly and not rigidly to said drive shaft, which is movably supported by said cam during said drive shaft pauses, a key mover mechanism for selectively inserting said key into one of said two opposing radial grooves in said drive shaft, a single control device located on one side of the main crank arm, a logic unit for controlling said control device, in that said key mover mechanism comprises two keying levers each having respective pairs of ends with at least one of said ends being a free end and both pivoted on said cam such that said levers lie opposite each other about the key with which they cooperate via one of their ends, each of their free ends being diametrically opposite about and at the same distance from the axis of the drive shaft, said levers having an identical arm ratio and having means at their said free ends for being alternately in cooperation with said single control device.

2. A high-speed rotary dobby as claimed in claim 1, further comprising a C-shaped guide on said control device, said two keying levers being identical in shape, the means at their free ends cooperating with said single control device being a pin projecting perpendicularly from said keying lever free end of one of said keying levers for insertion into said C-shaped guide for motion radially to the drive shaft in one direction and the other in response to the key insertion and withdrawal from said radial grooves in said drive shaft.

3. A high-speed rotary dobby as claimed in claim 1, characterized in that said key is secured with one of the ends of one of said two keying levers pivoted in opposing positions on the cam.

4. A high-speed rotary dobby as claimed in one of the preceding claims, characterized in that the said two keying levers mutually cooperate where one of them comprises a key in the form of a single hook, said levers being spring-loaded in the direction in which said key is inserted into the radial grooves in the drive shaft and being alternately operated at their free ends by one of a series of operating units controlled by a cam system of said control device for the rotary dobby, said operating unit further comprising locking recesses formed in the cam in diametrically opposite positions, two reaction spring loaded pushers, a control pusher and an auxiliary pusher of different travel strokes and of which said control pusher cooperates with one of said free ends of the keying levers and the auxiliary pusher cooperates with one of said two cam locking recesses provided in the cam in diametrically opposite positions about and at the same distance from the axis of the dobby drive shaft.

5. A high-speed rotary dobby as claimed in claim 4, further comprising in that said reaction springs for said keying levers insert said single hook key into the radial grooves in the drive shaft, and are housed in a slot formed in said cam and extend in the form of an inverted V between said slot and a pin which hinges said adjacent ends of said keying levers together.

6. A high-speed rotary dobby as claimed in claim 4, said control device for the rotary dobby further comprises means for hinging said control and auxiliary pushers on the same axis parallel to the drive shaft, and of which the control pusher parallel to the drive shaft which cooperates with one of the free ends of said keying levers via a tooth projecting from one of its ends, is urged by a spring against a fixed abutment into a position of disengagement and is made to rotate in opposition to said spring by said cam system of the control device, whereas the auxiliary second pusher, which cooperates with one of said locking recesses in the cam via a corresponding tooth projecting from its end, this latter tooth projecting further than the first, is urged by a spring extending between said two pushers in such a manner as to rotate said auxiliary second pusher towards said recesses until it reaches an abutment rigid with said first or control pusher.

7. A high-speed rotary dobby as recited in claim 4 in that said cam of said rotary dobby control device comprises two identical control units acting in the same direction on said dobby, and a set of striker bars of ferrous material equal in number to the number of main crank arms in the dobby, said bars being hinged at their ends to corresponding arms each equally projecting from a single shaft rocked by a cam, a spring for urging each striker bar against its individual accompanying arm and which arm rotates it from a first position in which it cooperates with the pusher of its own operating unit to a second position, an electromagnet energized in accordance with a predetermined program of said logic unit for cooperating with said pusher, said arms each being rigid with the single shafts, and the two shafts of the arms being connected together by a connecting rod in such a manner as to be made to rock in mutual opposition by a further single cam, the contour of which acts outside said pauses of the drive shaft, two control cams for synchronizing said single cam which are identical and are fixed onto the drive shaft offset angularly from each other so as to act alternately and only within said pauses at each half-revolution of drive shaft.

8. A high-speed rotary dobby as claimed in claim 7, wherein each of said control units further comprises an amagnetic shoulder for creating a small air gap between said respective striker bars and said associated electromagnet as said respective control unit is in its said second position.

* * * * *